United States Patent
Xi et al.

(10) Patent No.: US 11,684,982 B2
(45) Date of Patent: Jun. 27, 2023

(54) KEY DUPLICATING MACHINE AND ITS DUPLICATING METHOD

(71) Applicant: Shenzhen Xhorse Electronics Co., Ltd., Shenzhen (CN)

(72) Inventors: Yongfeng Xi, Shenzhen (CN); Yuan He, Shenzhen (CN); Yijie Hao, Weifang (CN)

(73) Assignee: SHENZHEN XHORSE ELECTRONICS CO., LTD, Shenzhen (CN)

(*) Notice: Subject to any disclaimer, the term of this patent is extended or adjusted under 35 U.S.C. 154(b) by 587 days.

(21) Appl. No.: 16/775,661

(22) Filed: Jan. 29, 2020

(65) Prior Publication Data

US 2020/0238399 A1  Jul. 30, 2020

(30) Foreign Application Priority Data

Jan. 29, 2019  (CN) .......................... 201910087665.3

(51) Int. Cl.
  *B23C 3/35*  (2006.01)
  *B23Q 5/40*  (2006.01)

(52) U.S. Cl.
  CPC ............. *B23C 3/35* (2013.01); *B23Q 5/402* (2013.01)

(58) Field of Classification Search
  CPC ....... B23C 2260/84; B23C 3/35; B23C 3/355; B23C 2235/48; B23C 2235/28; B23B 2260/136
  See application file for complete search history.

(56) References Cited

U.S. PATENT DOCUMENTS

| 4,687,389 | A | * | 8/1987 | Santii | B23C 3/35 |
| | | | | | D15/127 |
| 5,997,224 | A | * | 12/1999 | Beauregard | B23C 3/35 |
| | | | | | 409/110 |
| 2006/0133903 | A1 | * | 6/2006 | Shiraishi | B23Q 11/08 |
| | | | | | 409/134 |
| 2018/0079015 | A1 | * | 3/2018 | Marsh | G06V 20/66 |
| 2020/0222995 | A1 | * | 7/2020 | Jalove | B23C 3/35 |

FOREIGN PATENT DOCUMENTS

| WO | 2006027294 A1 | 3/2006 |
| WO | 2015010936 A1 | 1/2015 |
| WO | 2018122782 A1 | 6/2018 |
| WO | WO-2018122782 A1 * | 7/2018 |

* cited by examiner

*Primary Examiner* — Boyer D Ashley
*Assistant Examiner* — Reinaldo A Vargas Del Rio
(74) *Attorney, Agent, or Firm* — Myers Wolin, LLC (57) ABSTRACT

A key duplicating machine and duplicating process are disclosed. The key duplicating machine comprises a base, a main axis processing device, a detecting device, a feeding device, a clamping device and a drive device. The base comprises a vertical plate and a horizontal plate, separates the horizontal plate into a front part and a rear part. The main axis processing device and the detecting device are both flexibly connected to the vertical plate and arranged on the side facing the front part. The base separates the processing area from the drive area so that processing residues produced in the processing area will not easily invade the drive area, ensuring that the drive area will be clean and free from contamination, reducing the probability of damage to the motor, guide rail and other structures in the drive area, and increasing the stability and lifespan of the key duplicating machine.

6 Claims, 4 Drawing Sheets

FIG. 6

KEY DUPLICATING MACHINE AND ITS DUPLICATING METHOD

CROSS REFERENCES TO RELATED APPLICATIONS

This application claims the benefit of the Chinese Patent Application No. CN201910087665.3, filed on Jan. 29, 2019. The disclosure and entire teachings of the Chinese Patent Application CN201910087665.3 are hereby incorporated by reference.

FIELD OF THE INVENTION

The present application is directed toward the field of key duplicating, particularly a key duplicating machines and its duplicating methods.

BACKGROUND OF THE INVENTION

Existing vertical milling key duplicating machines include manual vertical milling key duplicating machines and numerically controlled vertical milling key duplicating machines, and the numerically controlled key duplicating machines currently available generally have the disadvantages of large dimensions, a less compact structure and inconvenience to carry and use. Further, the feeding mechanism of the existing numerically controlled key processing machines is usually exposed in the processing area and directly connected to the processing mechanism, which weakens the protective performance and allows processing residues to easily invade the movable guide rail, thereby affecting the processing precision.

Patent application IT201600132785A1 describes the key duplicating machine comprising a support structure defining an alignment plane XY, a feeler assembly and a cutter assembly which are movable with respect to said structure from and toward the alignment plane XY, said feeler assembly and said cutter assembly each defining a longitudinal axis for a feeler tool and a cutter tool, respectively. The feeler assembly and the cutter assembly comprise respective grasp members adapted to hold the feeler tool and the cutter tool, respectively, and respective actuators adapted to control said respective grasp members to release said feeler tool and said cutter tool respectively. Said duplicating machine further comprises a control which is simultaneously active on said actuators so as to control the simultaneous release of the feeler tool and the cutter tool.

From the patent application WO2015010936A1 electronic key duplication machine is known. The duplication machine comprise a base on which a first support is mounted for a clamp intended to clamp between its jaws at separate moments, an original key to be duplicated and a blank key to be bitted, an optical reader for sensing the bitting of the original key to be duplicated, and a milling cutter for reproducing said bitting on the blank key. The optical reader and the milling cutter are mounted on a second support rigid with the machine base, associated with the base to drive the clamp along the X axis and the Y axis relative to the second support, a unit for memorizing the bitting of the key to be duplicated sensed by the optical reader and for controlling and commanding the movement of the clamp and the operability of the optical reader and of the milling cutter. The said second support for the optical reader and for the milling cutter is of C-shape with its opening facing the clamp, and—the optical reader is mounted on the two horizontal branches of said second C-shaped support, while the milling cutter is mounted in the cavity defined by said horizontal branches.

Patent application No. WO2006027294A1 refers to a key cutting machine for the duplication of keys, in particular of so-called "laser-type" keys, comprising a mechanical machining unit connected to an electronic control unit that is provided with memory means for storing the coded data of the keys to be duplicated, in which said mechanical machining unit comprises, along with a tracer or key follower for tracking the bit notch pattern of 15 the keys to be duplicated, a spindle and a milling cutter associated thereto, both said cutter and said spindle being adapted to be driven rotatably about the axis thereof, as well as a carriage on which there is mounted a jaw. The carriage is movable on the base-plate of the mechanical machining unit in a plane that is orthogonal to the plane of the milling cutter and the key follower or tracer. Said milling cutter is temporarily attached to the end portion of a stem that is adapted to be inserted axially in said spindle through the back-side end portion of the latter, so as to enable said milling cutter to be fastened to said end portion of the same spindle. The milling cutter is adapted to be brought into contact with a reference plane on the jaw so as to directly and readily achieve a correct setting and adjustment of the milling cutter itself in the operating position thereof.

SUMMARY

The present solution is principally intended to provide a key duplicating machine and its duplicating method which can prevent processing residues from entering the mobile guide rail mechanism of the key duplicating machine.

The present solution discloses a key duplicating machine, which comprises a base, a main axis processing device, a detecting device, a feeding device, a clamping device and a drive device.

The base comprises a vertical plate and a horizontal plate: the vertical plate and the horizontal plate intersect, the vertical plate separates the horizontal plate into a front part and a rear part, and the vertical plate has a through hole. The main axis processing device and the detecting device are both flexibly connected to the vertical plate and arranged on the side facing the front part. The feeding device is flexibly connected to the horizontal plate and crosses the horizontal plate via the through hole; the clamping device is rigidly connected to the feeding device and arranged in the front part.

Driven by the drive device, the feeding device is used to take the key on the clamping device to the processing position of the main axis processing device and the detecting position of the detecting device; the detecting device is used to detect and calibrate the precise position of the clamping device or the precise position of the key on the clamping device, while the main axis processing device is used to duplicate and process the key based on the calibration and detection result of the detecting device.

Further, the feeding device is flexibly connected to the horizontal plate through the guide rail mechanism, and the guide rail mechanism comprises a first guide rail and a second guide rail; the feeding device comprises a first feeding part and a second feeding part; the drive device comprises a first drive unit and a second drive unit.

The first feeding part is flexibly connected to the horizontal plate through the first guide rail, the second feeding part is flexibly connected to the first feeding part, the first guide rail and the second guide rail are perpendicular to one another, and the second feeding part is rigidly connected to the clamping device after crossing the through hole.

The first drive unit is rigidly connected to the base and used to drive the first feeding part to slide along the first guide rail; the second drive unit is rigidly connected to the first feeding part and used to drive the second feeding part to slide along the second guide rail.

Moreover, it also comprises a sealing component: the sealing component comprises a mobile plate which covers the through hole and is flexibly connected to the vertical plate. The mobile plate has an inner hole and is arranged on the feeding device through the inner hole.

Further, the main axis processing device comprises a main axis base, a drive mechanism, a transmission mechanism, a main axis mechanism and a processing cutter.

The main axis base forms a sliding connection with the vertical plate. The drive mechanism, the transmission mechanism and the main axis mechanism are arranged on the main axis base, and the drive mechanism forms a transmission connection with the main axis mechanism through the transmission mechanism. The processing cutter is arranged at one end of the main axis mechanism towards the clamping device and is used to process the key as driven by the drive motor.

Further, it also comprises a protective component: the protective component shields the main axis processing device, one end of the protective component towards the clamping device is fitted with a one-way opening, and the processing cutter passes through the one-way opening to process the key.

Further, the detecting device comprises a probe and a probe base: the probe base is flexibly connected to the vertical plate, and the probe is located at one end of the probe base towards the clamping device.

Further, it also comprises a wireless control module: the wireless control module is connected to the drive device and is used to receive wireless control commands and control the movement of the drive device.

This solution also discloses a key duplicating method which is applicable to any key duplicating machine as outlined above and characterized by the following:

Driving the detecting device to detect a plurality of times and obtain the parameters of the precise position of the key blank on the clamping device;

Driving the main axis processing device to process the key blank based on the precise position parameters and the bitting code of the key obtained.

The steps include:

Comparing the actual position parameters and the standard position parameters of the bitting code of the key to obtain the deviation parameter of the key blank on the clamping device;

Calibrating the standard position parameters based on the deviation parameter to get the calibrated position parameters;

processing the key blank based on the calibrated position parameters and the bitting code of the key obtained.

Further, it also comprises the following steps before the steps to drive the main axis processing device to duplicate the key based on the precise position parameters and the bitting code of the key obtained:

Receiving the bitting code of the key based on the instruction, or drive the detecting device to detect the original key a plurality of times to obtain the bitting code of the key.

Compared to the existing technologies, the benefits of this solution are as follows: this solution discloses a key duplicating machine and its duplicating method, where the key duplicating machine comprises a base, a main axis processing device, a detecting device, a feeding device, a clamping device and a drive device. The base comprises a vertical plate and a horizontal plate; the vertical plate and the horizontal plate intersect, the vertical plate separates the horizontal plate into a front part and a rear part, and the vertical plate has a through hole. The main axis processing device and the detecting device are both flexibly connected to the vertical plate and arranged on the side facing the front part. The feeding device is flexibly connected to the horizontal plate and crosses the horizontal plate via the through hole; the clamping device is rigidly connected to the feeding device and arranged in the front part. Driven by the drive device, the feeding device is used to take the key on the clamping device to the processing position of the main axis processing device and the detecting device position of the detecting device; the detecting device is used to detect and calibrate the precise position of the clamping device or the precise position of the key on the clamping device, while the main axis processing device is used to duplicate and process the key based on the calibration and detection result of the detecting device. By incorporating a horizontal plate and a vertical plate, the base separates the processing area of the key duplicating machine from the drive area so that processing residues produced in the processing area (such as metal residues) will not easily invade the drive area, ensuring that the drive area will be clean and free from contamination, reducing the probability of damage to the motor, guide rail and other structures in the drive area, and increasing the stability and lifespan of the key duplicating machine.

Other features and advantages of the present invention will be apparent from the following more detailed description, taken in conjunction with the accompanying drawings which illustrate, by way of example, the principles of the solution.

The purpose realization, functional characteristics and advantages of this solution will be further described with the preferred embodiment and the attached drawings.

DETAILED DESCRIPTION OF THE PREFERRED EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

Figure 1:
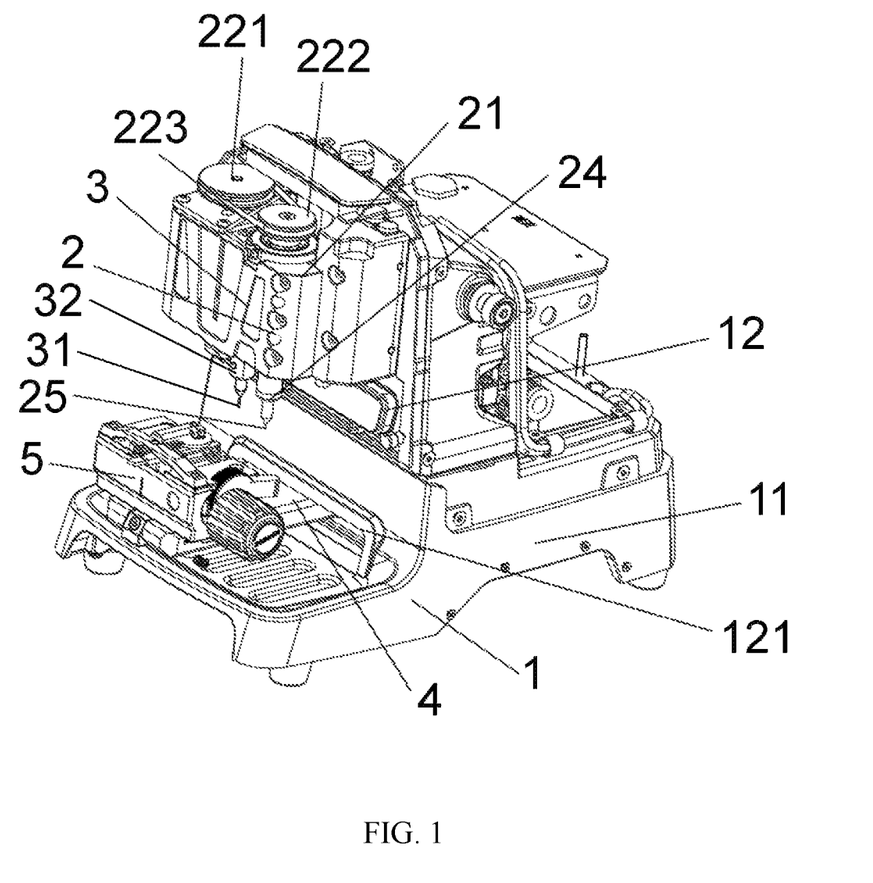
FIG. 1 shows the schematic diagram for the overall structure of the key duplicating machine without the seal in a preferred embodiment of this solution.
Figure 2:
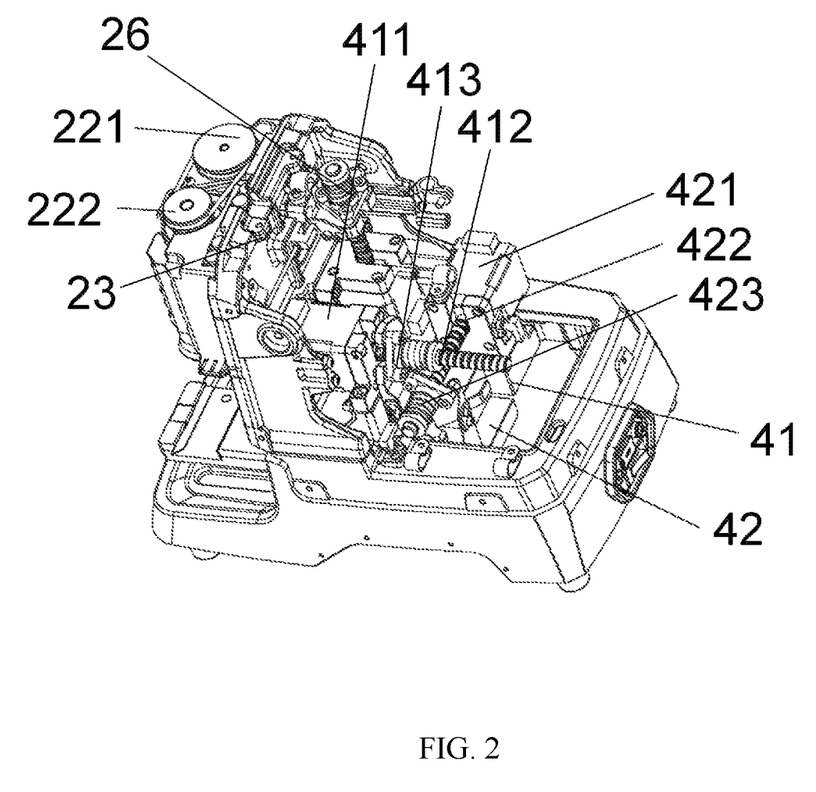
FIG. 2 shows the schematic diagram for the overall structure of the feeding device in FIG. 1 for the key duplicating machine under this solution.

As shown in FIG. 1 and FIG. 2, the present application discloses a key duplicating machine, which comprises a base 1, a main axis processing device 2, a detecting device 3, a feeding device 4, a clamping device 5 and a drive device.

The base 1 comprises a vertical plate 12 and a horizontal plate 11, which intersect. The vertical plate 12 and the horizontal plate 11 are perpendicular to one another and intersect in a preferred embodiment, the vertical plate 12 separates the horizontal plate 11 into the front part and the rear part, and the vertical plate 12 has a through hole 121. The main axis processing device 2 and the detecting device 3 are both flexibly connected to the vertical plate 12 and arranged on the side facing the front part, the feeding device 4 is flexibly connected to the horizontal plate 11 and crosses the horizontal plate 11 via the through hole 121, and the clamping device 5 is rigidly connected to the feeding device 4 and arranged in the front part of the horizontal plate 11. In the key duplicating machine, the vertical plate 12 structure divides the horizontal plate 11 into a processing area and a drive area, where the processing area comprises the front part of the horizontal plate 11 where the main axis processing device 2, the detecting device 3 and the clamping device 5 are located, and the drive area is the rear part of the horizontal plate 11 where the feeding device is installed, and comprises the drive device and the guide rail. In a specific preferred embodiment, the main axis processing device 2 and the detecting device 3 are flexibly connected to the vertical plate 12 and arranged above the clamping device 5. After the feeding device 4 drives the clamping device 5 to the processing position below the main axis processing device 2 and the detecting device 3, the main axis processing device 2 and the detecting device 3 will slide down along the guide rail and arrive at the processing position to detect or process the clamping device 5 and the key on it, meaning they form an XYZ three-axis coordinate system with the horizontal plate 11 and the vertical plate 12. In the coordinate system, the plane of the horizontal plate 11 is the X axis and the Y axis and the plane of the vertical plate 12 is the Z axis. The clamping device 5 can move along the X axis and the Y axis to the appropriate processing position below the main axis processing device 2 and the detecting device 3; the detecting device 3 and the main axis processing device 2 move along the Z axis and slide downward to the processing position to detect or process the clamping device 5 and the key on it. As the vertical plate 12 exists, processing residues produced in the processing area (such as metal residues) will not easily invade the drive area, ensuring that the drive area will be clean and free from contamination, reducing the probability of damage to the motor, guide rail and other structures in the drive area, and increasing the stability and lifespan of the key duplicating machine.

Driven by the drive device, the feeding device 4 is used to take the key on the clamping device 5 to the processing position of the main axis processing device 2 and the detecting device position of the detecting device 3; and the detecting device 3 is used to detect and calibrate the precise position of the clamping device 5 or the precise position of the key on the clamping device 5, while the main axis processing device 2 is used to duplicate and process the key based on the calibration and detection result of the detecting device 3. By incorporating a horizontal plate 12 and a vertical plate 11, the base 1 separates the processing area of the key duplicating machine from the drive area so that processing residues produced in the processing area (such as metal residues) will not easily invade the drive area, ensuring that the drive area will be clean and free from contamination, reducing the probability of damage to the motor, guide rail and other structures in the drive area, and increasing the stability and lifespan of the key duplicating machine.

As illustrated in FIG. 1 and FIG. 2, in some preferred embodiments, the feeding device 4 is flexibly connected to the horizontal plate 11 through the guide rail mechanism, where the guide rail mechanism comprises a first guide rail 431 and a second guide rail 432, the feeding device 4 comprises a first feeding part 41 and a second feeding part 42, and the drive device comprises a first drive unit and a second drive unit. The first feeding part 41 is flexibly connected to the horizontal plate 11 via the first guide rail, the second feeding part 42 is flexibly connected to the first feeding part 41 via the second guide rail 432, and the first guide rail and the second guide rail 432 are perpendicular to one another. The second feeding part 42 is rigidly connected to the clamping device 5 after crossing the through hole 121, and the clamping device 5 is used to clamp the key; the first drive unit is rigidly connected to the base 1 and used to drive the first feeding part 41 to slide along the first guide rail; the second drive unit is rigidly connected to the first feeding part 41 and used to drive the second feeding part 42 to slide along the second guide rail 432.

When the key is processed, driven by the drive device, the first feeding part 41 and the second feeding part 42 are used to drive the key on the clamping device 5 to the processing position of the main axis processing device 2 and the detecting device 3. In some preferred embodiments, the main axis processing device 2 and the detecting device 3 are arranged at one end of the first guide rail 431 and parallel to the second guide rail 432. When facing the main axis processing device 2 and the detecting device 3, the first feeding part 41, driven by the first drive unit, will move along the first guide rail. The second feeding part 42 is flexibly connected to the first feeding part 41 via the second guide rail 432, and the first guide rail and the second guide rail 432 are perpendicular to one another, more specifically, the second guide rail 432 is perpendicular to the movement direction of the first feeding part 41. Therefore, at this time, the first feeding part 41 will drive the second feeding part 42 to move back and forth along the second guide rail 432, thereby driving clamping device 5 to move back and forth. The length of the through hole 121 in the direction parallel to the second guide rail 432 is greater than that of the second feeding part 42. Driven by the second drive unit, the second feeding part 42 will move left and right inside the through hole 121 along the second guide rail 432, thereby driving the clamping device 5 to move left and right. Because the second feeding part 42 is flexibly connected to the first feeding part 41 via the second guide rail 432, the second feeding part 42 will not drive the first feeding part 41 to move simultaneously when it moves left and right. Driven by the first drive unit and the second drive unit, the first feeding part 41 and the second feeding part 42 will direct the clamping device 5 to the processing position on the main axis processing device 2 and direct the detecting device 3 to process the key.

In some preferred embodiments, the first drive unit and the second drive unit both use the integrated screw motor. The first drive unit comprises a first motor 411, a first screw 412 and a first nut 413, where the first motor is fixed on the base, the first screw is parallel to the first guide rail, and the first feeding part is thread connected to the first screw 412 through the first nut 413. When the first motor 411 drives the first screw 412 to rotate, the first nut 413 will screw in or out along the first screw 412, thereby driving the first feeding part 41 to move back and forth along the first guide rail 431. The second drive unit comprises a second motor 421, a second screw 422 and a second nut 423, where the second motor 421 is fixed on the first feeding part 41, the second screw 422 is parallel to the second guide rail 432, and the second feeding part 42 is thread connected to the second screw 422 through the second nut 423. When the second motor 421 drives the second screw 422 to rotate, the second nut 423 will screw in or out along the second screw 422, thereby driving the second feeding part 42 to move left and right along the second guide rail 432. The integrated screw motors are used to slash the space occupied by the drive device in the overall structure of the key duplicating machine. In addition, they are combined with the feeding device 4 to further streamline the overall structure of the key duplicating machine, reduce the space required and help the user pick up and carry the machine.

After the first drive unit and the second drive unit drive the clamping device 5 to the detecting position, the detecting device (driven by the drive device) will also enter the detecting position to detect the precise position of the clamping device 5, or precise position of the key on the detecting device, to obtain the precise position parameters of the key so that the main axis processing device 2 can duplicate the key based on the precise position parameters collected by the detecting device 3 after it reaches the processing position along the guide rail mechanism. The drive device and the feeding device 4 supplement one another to achieve the compact structure, small size and convenience of the key duplicating machine.

Figure 4:
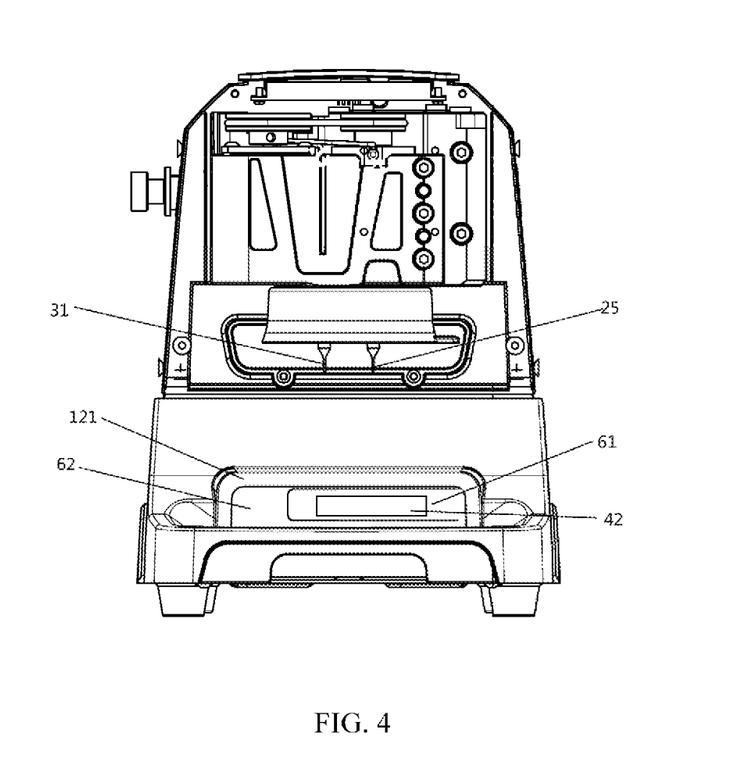
FIG. 4 shows the schematic diagram for the front view structure of the key duplicating machine under this solution in another preferred embodiment.

As illustrated in FIGS. 1, 2 and 4, the vertical plate 12 is fitted with a through hole 121 for the second feeding part 42 to move through, so processing residues produced in the processing area may still enter the drive area via the through hole 121 on the vertical plate 12, thereby damaging the motor or the guide rail mechanism. In some preferred embodiments, the machine also comprises a sealing component: the sealing component comprises a mobile plate which covers the through hole 121 and is flexibly connected to the vertical plate 12. The mobile plate has an inner hole and is arranged on the second feeding part 42 through the inner hole.

When the second feeding part 42 follows the first feeding part 41 to move back and forth in the direction of the first guide rail 431, the second feeding part 42 will stretch towards the front part of the base 1 through the inner hole on the mobile plate or retract to the rear part of the base 1. The second feeding part 42 has a small displacement during the movement back and forth and will not fully break out of the inner hole. At this time, the mobile plate will be always positioned on the second feeding part 42 through the inner hole to prevent processing residues from entering the drive area in the rear part of the horizontal plate 11 through the gap between the second feeding part 42 and the through hole 121, thereby reducing the probability of damage to the motor, guide rail and other structures in the drive area.

When the second feeding part 42 moves left and right in the direction of the second guide rail 432, the mobile plate will follow the second feeding part 42 to move left and right inside the through hole 121 as the mobile plate is flexibly connected to the vertical plate 12; the mobile plate will be always positioned on the second feeding part 42 through the inner hole to prevent processing residues from entering the drive area in the rear part of the horizontal plate 11 through the gap between the second feeding part 42 and the 121, thereby reducing the probability of damage to the motor, guide rail and other structures in the drive area.

In some preferred embodiments, the mobile plate comprises a first mobile plate 61 and a second mobile plate 62; the first mobile plate 61 is fitted with a first inner hole, and the second mobile plate 62 is fitted with a second inner hole. While the second mobile plate 62 covers the through hole 121 on the vertical plate 12 and is flexibly connected to the vertical plate 12, the first mobile plate 61 covers the second inner hole and is flexibly connected to the second mobile plate 62; the first mobile plate 61 is arranged around the second feeding part 42 through the first inner hole. The length of the second inner hole in the direction of the second guide rail 432 is greater than that of the first inner hole and smaller than that of the through hole 121 on the vertical plate 12.

When the second feeding part 42 follows the first feeding part 41 to move back and forth in the direction of the first guide rail 431, the second feeding part 42 will stretch towards the front part of the base 1 through the first inner hole on the first mobile plate 61 or retract to the rear part of the base 1. The second feeding part 42 has a small displacement during the movement back and forth and will not fully break out of the inner hole. At this time, the first mobile plate 61 will be always positioned on the second feeding part 42 through the first inner hole to prevent processing residues from entering the drive area in the rear part of the horizontal plate 11 through the gap between the second feeding part 42 and the through hole 121, thereby reducing the probability of damage to the motor, guide rail and other structures in the drive area.

When the second feeding part 42 moves in the direction of the second guide rail 432, the first mobile plate 61 will follow the second feeding part 42 to move left and right inside the second through hole 121, as the first mobile plate 61 is flexibly connected to the second mobile plate 62. The mobile plate will be always positioned on the second feeding part 42 through the inner hole to prevent processing residues from entering the drive area in the rear part of the horizontal plate 11 through the gap between the second feeding part 42 and the second inner hole. When the second feeding part 42 has a large displacement when moving left and right and the second feeding part 42 reaches the edge of the second inner hole, the second feeding part 42 will drive the first mobile plate 61 and the second mobile plate 62 to move together left and right inside the through hole 121 of the vertical plate 12 to prevent processing residues from entering the drive area in the rear part of the horizontal plate 11 through the gap between the second feeding part 42 and the 121, thereby reducing the probability of damage to the motor, guide rail and other structures in the drive area.

Figure 3:
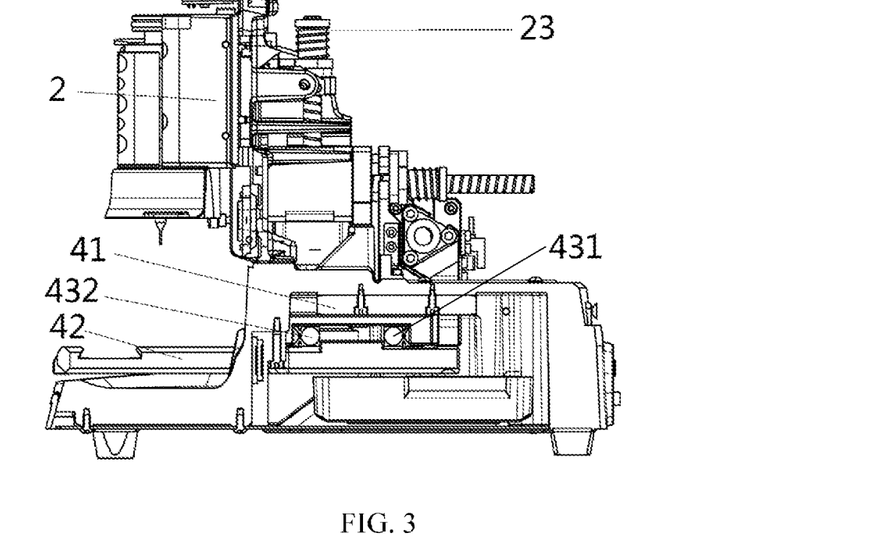
FIG. 3 shows the schematic diagram for the side view structure of the feeding device in FIG. 1 for the key duplicating machine under this solution.

As illustrated in FIGS. 1, 2 and 3, in some preferred embodiments, the main axis processing device comprises a main axis base 21, a drive mechanism 23, a transmission mechanism, a main axis mechanism 24 and a processing cutter 25.

The main axis base 21 is flexibly connected to the vertical plate 12 via the guide rail mechanism. In detail, the main axis base 21 is flexibly connected to the vertical plate 12 via the guide rail and is driven by the third drive unit 26 to slide on the vertical plate 12. The drive mechanism 23, the transmission mechanism and the main axis mechanism 24 are arranged on the main axis base 21. The drive mechanism 23 forms a drive connection with the main axis mechanism, the processing cutter 25 is arranged at one end of the main axis mechanism 24 towards the clamping device 5, the drive mechanism drives the main axis base 21 to slide along the guide rail mechanism and approach or break away from the clamping device 5, and when it approaches the clamping device 5, it will drive the processing cutter 25 to process the key through the drive mechanism 23. In a specific preferred embodiment, the drive mechanism 23 is a brushless motor with external rotor, the transmission mechanism consists of a driving wheel 221, a driven wheel 222 and a transmission belt 223, and the processing cutter 25 is a milling cutter. The output end of the brushless motor with external rotor is connected to the driving wheel 221, the driving wheel 221 is connected to the driven wheel 222 through the transmission mechanism, the main axis mechanism 24 is connected to the driven wheel 222. When the brushless motor with external rotor makes an output, it will drive the driving wheel 221 to rotate, the driving wheel 221 will drive the driven wheel 222 to rotate and further drive the main axis mechanism 24 and the milling cutter at one end of the main axis mechanism 24 to rotate, thereby using the milling cutter to process the key. This solution uses a brushless motor with external rotor, which has the advantages of a large power range, low noise, small size and high rotary speed; this will further streamline the overall structure of the key duplicating machine, reduce the space required and make it easier to pick up and carry the machine.

Figure 5:
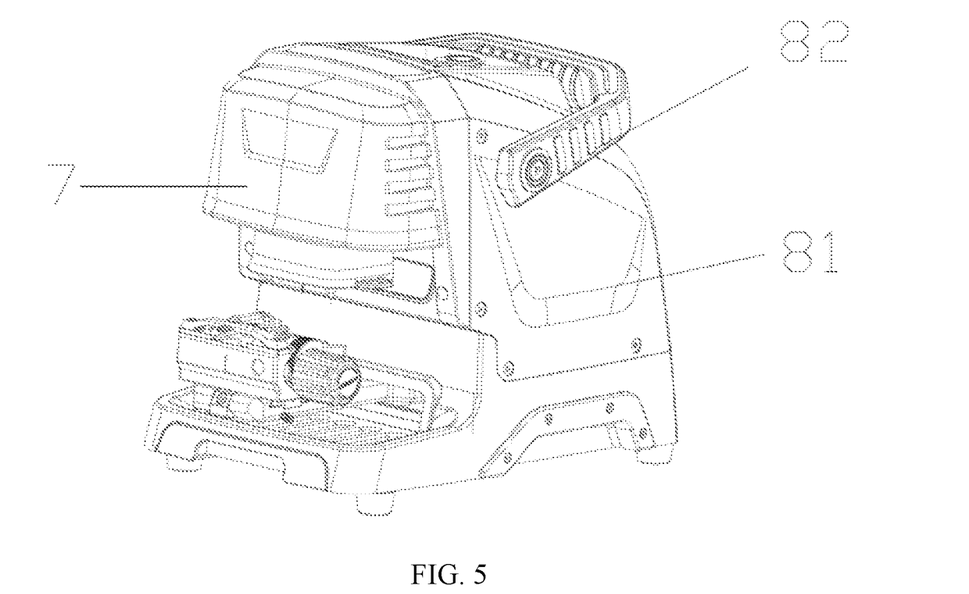
FIG. 5 shows the schematic diagram for the overall structure of the key duplicating machine with the seal in another preferred embodiment of this solution.

As illustrated in FIGS. 1 and 5, in some preferred embodiments, it also comprises a protective component 7: the protective component 7 shields the main axis processing device 2, one end of the protective component 7 towards the clamping device 5 is fitted with a one-way opening, and the processing cutter 25 passes through the one-way opening to process the key. When the processing cutter 25 is used to process the key, the protective component 7 is positioned above the processing area, shielding it so that the processing residues will be stopped by the protective component 7 and not fly around, thereby improving user safety while operating the key duplicating machine. In some preferred embodiments, the protective component 7 includes two axial holes inside which magnetic elements are fixed; the main axis base 21 is accordingly equipped with two magnetic absorptive axial pins that fit together with the protective component 7, and the protective component 7 is installed on the main axis processing device 2 through a pin structure. By inserting or pulling the pin on one side, the user can rotate to open the protective component 7 without needing any additional tool, and replace the processing cutter 25 and the probe 31, thereby simplifying the operation.

As illustrated in FIGS. 1 and 2, in some preferred embodiments, the detecting device 3 comprises a probe 31 and a probe base 32; the probe base 32 is flexibly connected to the vertical plate 12 through the guide rail mechanism. In detail, the probe base 32 is flexibly connected to the vertical plate 12 through the guide rail, the clamping device 5 is arranged at one end of the guide rail mechanism, and the probe 31 is mounted at one end of the probe base 32 towards the clamping device 5. In a specific preferred embodiment, the probe base 32 is rigidly connected to the main axis base 21 and the probe 31 is arranged parallel to the processing cutter 25, meaning that when the drive device drives the main axis base 21 to slide on the vertical plate 12, the probe base 32 will follow the main axis base 21 to simultaneously move along the vertical plate 12. When processing the key, the machine will first use the probe 31 to detect the clamping device 5 and the key. When the probe 31 makes contact with the clamping device 5 or the key, it will generate an electric signal, and the main axis processing device 2 will receive the electric signal to get the actual position parameters of the clamping device 5 and the key, and then process the key in line with the actual position parameters detected by the detecting device 3. The processing cutter 25 is arranged in parallel to the probe 31. Thus, when the main axis processing device 2 processes the key with the precise position parameters detected by the detecting device 3, it will only need to compensate the displacement for the precise position parameters and then directly use the parameters, thereby simplifying the calculation process at processing. Besides, the probe base 31 synchronously moves with the main axis base 21 on the vertical plate 12, and compared to the structure where the probe base 32 and the main axis base 21 are flexibly connected to the vertical plate 12, this design will create three benefits: firstly, they will share one guide rail mechanism and drive device, thereby reducing the number of components and parts, ensuring an even more compact overall structure for the key duplicating machine and reducing the occupied space; secondly, they will share one stroke, thereby reducing the total strokes in processing, making it simpler and saving energy; thirdly, the probe base 31 is rigidly connected to the main axis base 21, which will reduce the probability of a deviation in the relative position between the probe base 31 and the main axis base 21, reduce the probability of error when a displacement compensation is performed for the precise position parameters and increase the processing precision when the main axis processing device 2 processes the key with the precise position parameters detected by the detecting device 3.

In some preferred embodiments, it also comprises a wireless control module: the wireless control module is connected to the drive device, and is used to receive wireless control commands and control the drive of the drive device. In particular, the user can use an application to send a wireless control command to the wireless control module, and the wireless control module will start or stop the drive device based on the control command, thereby permitting the user to remotely control the key duplicating machine's key processing. The wireless control module may be a Bluetooth control module or a Wi-Fi control module and can accept a wireless control command through Bluetooth connection or Wi-Fi connection. The application-based smart operation replaces the touchscreen, which will further simplify the operation of the key duplicating machine and make the overall structure even more compact.

As illustrated in FIGS. 1 and 5, in some preferred embodiments, the base 1 is also equipped with a drawer used to store parts and cutting residues and better help the user gather and clear away processing residues. The base is fitted with a shell 81 and a handle 82: the shell 81 is arranged in the rear part of the horizontal plate 11 to protect the drive area of the key duplicating machine, and the handle 82 is rigidly connected to the shell 81 and sleeved on both sides of the base. It can rotate in relation to the base 1, and the user can pick up the key duplicating machine with the handle 82, which will make it easier to carry the key duplicating machine.

Figure 6:
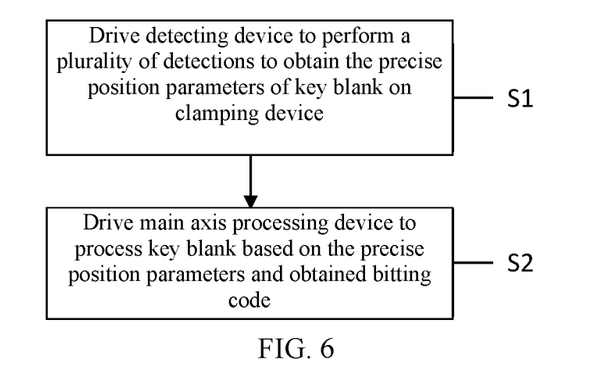
FIG. 6 shows the schematic diagram for the steps of the key duplicating method in a preferred embodiment of this solution.

As illustrated in FIG. 6, this application also discloses a key duplicating method which is applicable to any key duplicating machine as outlined above and comprises:

S1: Drive the detecting device to detect a plurality of times and obtain the parameters of the precise position of the key blank on the clamping device;

S2: Drive the main axis processing device to process the key blank based on the precise position parameters and the bitting code of the key obtained.

The aforesaid detecting device detects a plurality of times and obtains the parameters of the precise position of the key blank on the clamping device, and at this step S1, the detecting device 3 is controlled by the numerically controlled processing program to perform automatic detection. In some preferred embodiments, the detecting device 3 performs detection with a probe. In detail, when the processing program drives the probe 31 to detect downward and touch the specific position of the clamping device 5 or the key, a conducting loop will take shape between the detecting device 3 and the clamping device 5 and generate an electric signal, and the processing program will know the detected specific position of the clamping device 5 or the key based on the electric signal. The processing program will usually detect the specific position of the clamping device to determine the original point position for a three-axis coordinate system, then detect the key blank a plurality of times, and calculate the precise position parameters of the key blank on the clamping device 5 with the original point position as the reference to perform subsequent processing. In some other preferred embodiments, the program can also employ photoelectric signals to detect the precise position parameters of the key blank.

At the aforesaid step S2 where the processing program drives the main axis processing device to process the key blank based on the precise position parameters and the bitting code of the key obtained, a relative key coding standard has taken shape in the key area, particularly the automotive key area: one model corresponds to one key blank and has one coding standard, every key corresponds to a unique bitting code that comprises key blank data used for different models and the coding standard for the key blank. When duplicating the key, the processing program can use the bitting code of the key to determine the precise processing standard and step, and then use the precise position parameters of the key blank and the bitting code of the key obtained in step S1 to process the key blank.

This solution discloses a key duplicating method, which includes: S1: drive the detecting device to detect a plurality of times and obtain the parameters of the precise position of the key blank on the clamping device. S2: drive the main axis processing device to process the key blank based on the precise position parameters and the bitting code of the key obtained. The program collects the exact position parameters of the key blank on the clamping device through conducting detection, and then combines the parameters with the bitting code of the key to duplicate the key. This design has the following advantages: full automation of detection and processing, simple and easy operation and higher processing precision than artificial operation.

In some preferred embodiments, it will drive the main axis processing device to process the key blank based on the precise position parameters and the bitting code of the key obtained, and this step S2 includes:

S21: Compare the actual position parameter and the standard position parameter of the bitting code of the key to obtain the deviation parameter of the key blank on the clamping device;

S22: Calibrate the standard position parameter based on the deviation parameter to get the calibrated position parameter;

S23: Process the key blank based on the calibrated position parameters and the bitting code of the key obtained.

At the aforesaid step S21 to compare the actual position parameter and the standard position parameter corresponding to the bitting code of the key and obtain the deviation parameter of the key blank on the clamping device, the clamping device is equipped with a specific processing groove to hold the key blank. The position of the processing groove is definite, namely, its position parameter is definite; the standard position parameter of the key blank in the processing groove will also be definite. In detail, different key blanks correspond to different bitting codes, and their standard position parameters will also be different due to different sizes. Therefore, in some preferred embodiments, the machine will perform the processing based on the bitting code of the key and the standard position parameters of the key blank after the detecting device detects the key blank. To further increase the processing precision and reduce duplicating errors, this solution will control the detecting device to perform the detection a plurality of times and obtain the precise position parameters of the overall shape of the key blank on the clamping device after the detecting device detects the key blank. Compare the actual position parameters and the standard position parameters of the preset bitting code of the key after the actual position parameters of the key blank are detected to obtain the deviation parameter of the key blank on the clamping device, namely the error between the actual position parameters of the key blank and the standard position parameters.

At the aforesaid step S2 to calibrate the standard position parameters based on the deviation parameter and get the calibrated position parameters, the user can calibrate the standard position parameters based on the deviation parameter and get the calibrated position parameters. This is actually the step to correct the standard position parameters for the processing based on the actual position parameters of the key blank on the clamping device, make the processing parameters fully consistent with the actual position parameters of the key blank, and make the processing profile fully overlap the actual profile of the key blank to increase the processing precision.

At the aforesaid step S23 to process the key blank based on the calibrated position parameters and the bitting code of the key obtained, when the processing program processes the key blank based on the calibrated position parameters and the bitting code of the key, the calibrated position parameters of the key blank are already known, so the user can provide moderate compensation during processing. For example, if the calibrated position parameters show that the actual position of the key blank deviates left by 0.1 mm in relation to the standard position parameters, the user can accordingly deviate the key leftward by 0.1 mm to increase the processing precision and prevent the artificial clamping factor or a defect of the processing groove from causing a low precision. The program performs the detection a plurality of times to obtain the deviation parameter of the key blank on the clamping device, and finally moderately compensates the parameters based on the calibrated position parameters in processing to further increase the processing precision of the key duplicating machine.

In some preferred embodiments, it also comprises the following steps before the step S2 of driving the main axis processing device to duplicate the key based on the actual position parameters and the bitting code of the key obtained:

S01: Receive the bitting code of the key based on the instruction, or drive the detecting device to detect the original key a plurality of times to obtain the bitting code of the key.

At the aforesaid step S01 of receiving the bitting code of the key based on the instruction, or driving the detecting device to detect the original key a plurality of times to obtain the bitting code of the key, in some preferred embodiments, if the user has the bitting code of the key, he can enter this via the Bluetooth connection, Wi-Fi connection or using the touchscreen, and the processing program will determine the specific processing standard and steps based on the bitting code of the key it has received and automatically make a target key out of the key blank. In other preferred embodiments, if the user does not have the bitting code of the key, the processing program can drive the probe to detect the original key, including tooth position and tooth depth, to obtain the parameters of the key, and finally, the program will compare the parameters against the database to find the corresponding bitting code of the key.

The present application discloses a key duplicating method, which includes: S1: Drive the detecting device to detect a plurality of times and obtain the parameters of the precise position of the key blank on the clamping device; S2: Drive the main axis processing device to process the key blank based on the precise position parameters and the bitting code of the key obtained. The program obtains the precise position parameters of the key blank on the clamping device through conducting detection, and then combines these parameters with the bitting code of the key to duplicate the key. This design has the following advantages: full automation of detection and processing, simple and easy operation and higher processing precision than artificial operation.

The above description of preferred embodiments of the key duplicating machine and its duplicating method does not limit the scope of protection of the present solution. Any equivalent structures and equivalent flow with this specification and contents of the attached drawings, or direct or indirect use of the same in other related technical areas shall fall under the scope of patent protection of this solution by the same token.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A key duplicating machine, comprising:
    a base, a main axis processing device, a detecting device, a feeding device, a clamping device and a drive device, wherein
        the base comprises a vertical plate and a horizontal plate and the vertical plate and the horizontal plate intersect, wherein the vertical plate separates the horizontal plate into a front part and a rear part, and the vertical plate has a through hole, wherein
        the main axis processing device and the detecting device are both flexibly connected to the vertical plate and arranged on the side facing the front part, wherein
        the feeding device is flexibly connected to the horizontal plate and crosses the horizontal plate via the through hole, wherein
        the clamping device is rigidly connected to the feeding device and arranged in the front part, wherein
    driven by the drive device, the feeding device is used to take the key on the clamping device to the processing position of the main axis processing device and the detecting position of the detecting device, wherein the detecting device is used to detect and calibrate the precise position of the clamping device or the precise position of the key on the clamping device, wherein
        the main axis processing device is used to duplicate and process the key based on the calibration and detection result of the detecting device, wherein
    the feeding device installed on the rear part of the horizontal plate, and wherein
    the feeding device is flexibly connected to the horizontal plate through a guide rail mechanism.

2. The key duplicating machine according to claim 1, wherein
    the guide rail mechanism comprises a first guide rail and a second guide rail, wherein
    the feeding device comprises a first feeding part and a second feeding part, wherein the drive device comprises a first drive unit and a second drive unit, wherein the first feeding part is flexibly connected to the horizontal plate through the first guide rail and the second feeding part is flexibly connected to the first feeding part and the first guide rail and the second guide rail are perpendicular to one another, and the second feeding part is rigidly connected to the clamping device after crossing the through hole, wherein the first drive unit is rigidly connected to the base and used to drive the first feeding part to slide along the first guide rail;

the second drive unit is rigidly connected to the first feeding part and used to drive the second feeding part to slide along the second guide rail.

3. The key duplicating machine according to claim 1, wherein the key duplicating machine also comprises a sealing component, wherein the sealing component comprises a mobile plate which covers the through hole and is flexibly connected to the vertical plate, the mobile plate has an inner hole and is arranged on the feeding device through the inner hole.

4. The key duplicating machine according to claim 1, wherein the main axis processing device comprises a main axis base, a drive mechanism, a transmission mechanism, a main axis mechanism and a processing cutter, wherein the main axis base forms a sliding connection with the vertical plate, wherein the drive mechanism, the transmission mechanism and the main axis mechanism are arranged on the main axis base, wherein the drive mechanism forms a transmission connection with the main axis mechanism through the transmission mechanism, wherein the processing cutter is arranged at one end of the main axis mechanism towards the clamping device and is used to process the key as driven by a drive motor.

5. The key duplicating machine according to claim 4, wherein the key duplicating machine also comprises a protective component, wherein the protective component shields the main axis processing device and one end of the protective component towards the clamping device is fitted with a one-way opening and the processing cutter passes through the one-way opening to process the key.

6. The key duplicating machine according to claim 1, wherein the detecting device comprises a probe and a probe base, wherein the probe base is flexibly connected to the vertical plate and the probe is located at one end of the probe base towards the clamping device.

\* \* \* \* \*